(No Model.)
A. F. W. PARTZ.
VOLTAIC BATTERY.
No. 362,531. Patented May 10, 1887.
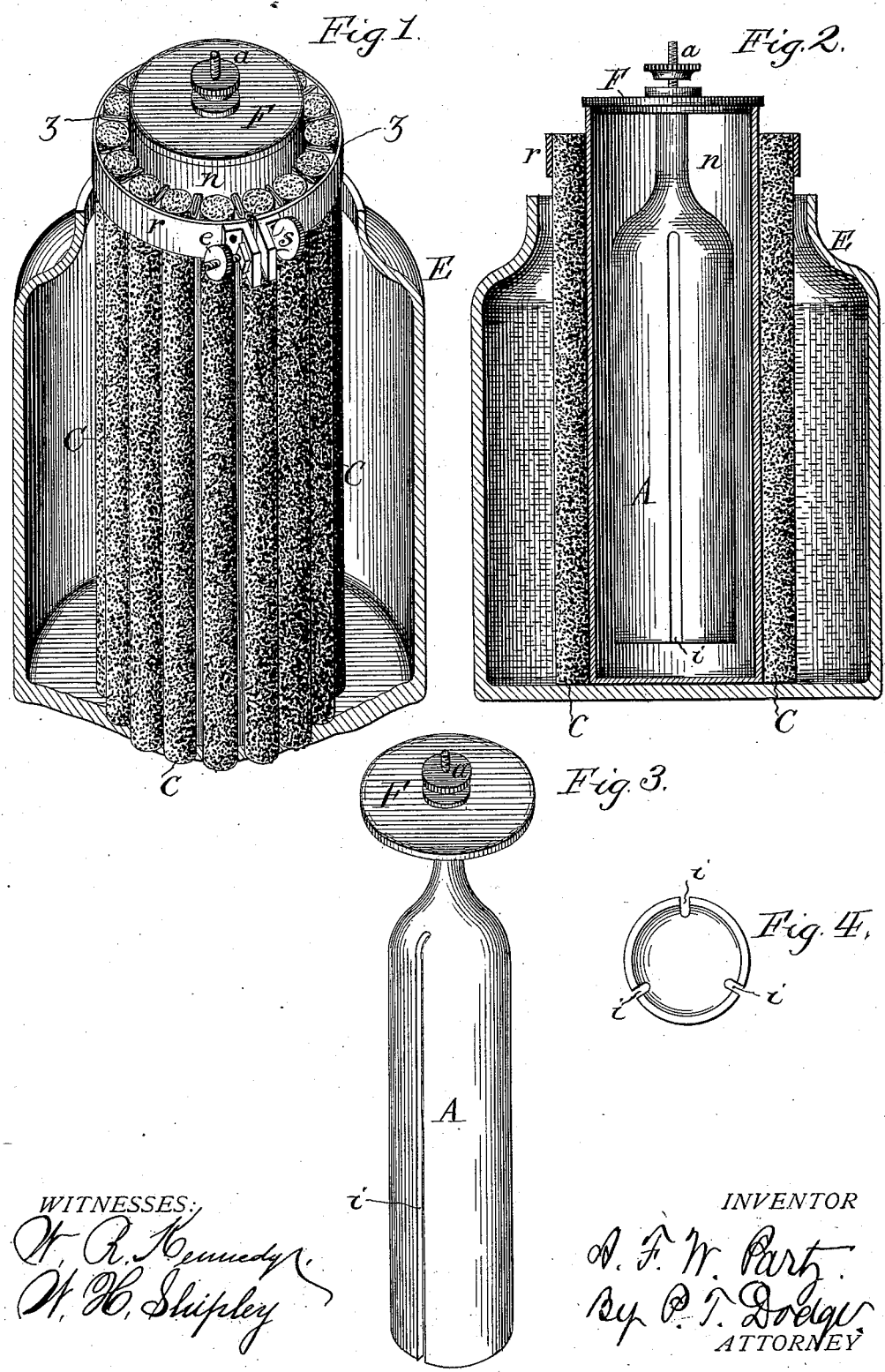
WITNESSES:
W. R. Kennedy
H. H. Shipley
INVENTOR
A. F. W. Partz
By P. T. Dodge
ATTORNEY

United States Patent Office.

AUGUST F. W. PARTZ, OF PHILADELPHIA, PENNSYLVANIA.

VOLTAIC BATTERY.

SPECIFICATION forming part of Letters Patent No. 362,531, dated May 10, 1887.

Application filed November 27, 1886. Serial No. 220,054. (No model.)

*To all whom it may concern:*

Be it known that I, AUGUST F. W. PARTZ, of Philadelphia, in the county of Philadelphia and State of Pennsylvania, have invented certain Improvements in Voltaic Batteries, of which the following is a specification.

In Bunsen or Poggendorff batteries, which are intended to furnish motive power, it is necessary, in order to obtain the strength of current generally required, and in view of the already imposed resistance of porous clay cells, that the electrodes, especially the negative, have a large effective surface and that they be as near together as possible; but the latter condition cannot well be complied with by the use of common carbon cylinders or plates, since their close proximity to the porous cells would hinder the requisite circulation of the depolarizing liquid, and cathodes composed of rows of isolated rods or bars of carbon placed in metallic connection and fixed to the covers of voltaic elements are difficult to make and liable to be broken in handling and transportation.

My invention consists, first, in a cathode formed of round or angular rods or bars of carbon which are, with narrow intervals, arranged around a porous clay cell containing an anode, and firmly attached thereto by means of a metallic ring or equivalent conducting device, the object being to bring the electrodes as near together as possible without hindering the depolarizing liquid from entering and circulating between the carbons and porous cell, save along the lines of their contact, and to form the cathode in a simple and inexpensive manner, while effectually shielding it against breakage; second, in a combination with a carbon cathode surrounding a porous clay cell of a hollow cylindrical anode having two or more vertical slots, so as to allow the excitant liquid freely to circulate, and being at its upper end bell-shaped and made to terminate in a solid stem for the purpose of reducing, as far as practicable, the waste of that portion of the anode which will be above the electrolyte.

In the accompanying drawings, Figure 1 is a projection, and Fig. 2 a vertical section, of a voltaic element embodying my invention. Fig. 3 is a separate projection of its anode. Fig. 4 is a horizontal section of the latter.

Rods of carbon, C, are arranged around a porous clay cell, $n$, and between them are closely inserted pieces of folded tin-foil $z$ of the proper thickness to keep the rods about an eighth of an inch apart. A metallic ring, $r$, tightened by a screw, $s$, holds the rods firmly to the porous cell. A knurled nut, $e$, upon the screw $s$ is for fastening the positive pole-wire. Before the device is put together the carbon rods and porous cell should, so far as they are not to be immersed, be impregnated with paraffine to prevent "creeping" of the electrolyte.

A is an anode of amalgamated zinc, attached to a cover, F, of varnished wood or other suitable material, by a screw, $a$, which is also to hold the negative pole-wire. The zinc is cast with a number of vertical slots, $i$, preferably three, to facilitate the circulation of the excitant liquid, so that less space may be allowed to intervene between the anode and porous cell than would otherwise be admissible.

I generally supply the porous cell with a solution of an alkaline sulphate or chloride, and the outer vessel, E, with a so-called "electropoion" fluid, though other well-known electrolytes may be used instead.

I do not claim a cathode composed of rods or bars of carbon surrounding a porous clay-cell without being closely and rigidly attached thereto. Neither do I confine myself strictly to the above-described manner of fixing a row of rods or bars of carbon by means of a metallic conductor around a porous clay cell, nor to any particular shape or dimensions of such rods or bars.

Having thus described my invention, what I claim is—

1. In a voltaic element, a cathode formed of rods or bars of carbon arranged with narrow spaces between them around a porous clay cell and firmly attached thereto by means of a metallic ring or equivalent conducting device, substantially as and for the purpose specified.

2. In a voltaic element, the combination of the porous cell, the series of carbon rods grouped closely around the same, the intermediate strips, $z$, and means, substantially as described, for confining said rods against the porous cell.

3. In a voltaic element the combination, with a carbon cathode surrounding a porous clay cell, of a hollow cylindrical anode having two or more vertical slots and being at its upper end reduced and terminated in a stem, substantially as and for the purpose set forth.

In testimony whereof I hereunto set my hand, this 12th day of November, 1886, in the presence of two attesting witnesses.

AUGUST F. W. PARTZ.

Witnesses:
I. SMITH,
R. T. FRAILEY.